(12) United States Patent
Cho et al.

(10) Patent No.: US 10,708,533 B2
(45) Date of Patent: Jul. 7, 2020

(54) DISPLAY DEVICE HAVING AN APPLIED CALIBRATION USING GRADATIONS AND CONTROL METHODS THEREOF

(71) Applicant: SAMSUNG ELECTRONICS CO., LTD., Suwon-si, Gyeonggi-do (KR)

(72) Inventors: Young-hoon Cho, Suwon-si (KR); Ji-yong Park, Suwon-si (KR); Sang-kyun Im, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 8 days.

(21) Appl. No.: 15/766,169

(22) PCT Filed: Aug. 18, 2016

(86) PCT No.: PCT/KR2016/009072
§ 371 (c)(1),
(2) Date: Apr. 5, 2018

(87) PCT Pub. No.: WO2017/061691
PCT Pub. Date: Apr. 13, 2017

(65) Prior Publication Data
US 2018/0295312 A1    Oct. 11, 2018

(30) Foreign Application Priority Data

Oct. 7, 2015    (KR) .................. 10-2015-0141164

(51) Int. Cl.
*H04N 5/44*    (2011.01)
*H04N 9/68*    (2006.01)
(Continued)

(52) U.S. Cl.
CPC ......... *H04N 5/4403* (2013.01); *G09G 3/2007* (2013.01); *G09G 3/3413* (2013.01);
(Continued)

(58) Field of Classification Search
None
See application file for complete search history.

(56) References Cited

U.S. PATENT DOCUMENTS

| | | |
|---|---|---|
| 6,583,791 B2 | 6/2003 | Berryman et al. |
| 2001/0033258 A1 | 10/2001 | Berryman et al. |

(Continued)

FOREIGN PATENT DOCUMENTS

| | | |
|---|---|---|
| KR | 10-0559266 | 3/2006 |
| KR | 10-2008-0017794 | 2/2008 |

(Continued)

OTHER PUBLICATIONS

International Search Report dated Dec. 14, 2016 in International Patent Application No. PCT/KR2016/009072.

*Primary Examiner* — Kee M Tung
*Assistant Examiner* — Patrick F Valdez
(74) *Attorney, Agent, or Firm* — Staas & Halsey LLP

(57) ABSTRACT

A display apparatus includes a signal receiver configured to receive an image signal having a plurality of gradations; a display configured to display an image based on the received image signal; a storage configured to store a plurality of calibration coefficients corresponding to more than two gradations from among the plurality of gradations to calibrate a uniformity of the image; and a controller configured to control the display to apply to the received image signal, a calibration coefficient corresponding to a gradation of the received image signal from among the plurality of gradations to display the image. With this, the uniformity of the image outputted from the display apparatus is exactly calibrated with respect to the plurality of gradations.

15 Claims, 23 Drawing Sheets

(51) Int. Cl.
G09G 3/20 (2006.01)
H04N 9/64 (2006.01)
G09G 3/34 (2006.01)
H04N 17/02 (2006.01)

(52) U.S. Cl.
CPC ............ H04N 9/64 (2013.01); H04N 9/68 (2013.01); *G09G 2320/0261* (2013.01); *G09G 2320/0271* (2013.01); *G09G 2320/0285* (2013.01); *G09G 2320/0673* (2013.01); *G09G 2320/0693* (2013.01); *H04N 17/02* (2013.01)

(56) References Cited

U.S. PATENT DOCUMENTS

| | | | | |
|---|---|---|---|---|
| 2007/0070085 | A1* | 3/2007 | Yamagata | G09G 3/20 345/606 |
| 2007/0211013 | A1* | 9/2007 | Uehara | G09G 3/3413 345/102 |
| 2013/0050504 | A1* | 2/2013 | Safaee-Rad | G09G 5/02 348/181 |
| 2014/0232625 | A1* | 8/2014 | Murase | G09G 3/2003 345/89 |
| 2014/0267785 | A1* | 9/2014 | Chen | H04N 17/02 348/189 |
| 2015/0243249 | A1* | 8/2015 | Nagashima | G09G 5/02 345/589 |
| 2015/0287370 | A1* | 10/2015 | Takahashi | G09G 3/3607 345/690 |

FOREIGN PATENT DOCUMENTS

| | | |
|---|---|---|
| KR | 10-2015-0038947 | 4/2015 |
| KR | 10-2015-0062100 | 6/2015 |
| KR | 10-2015-0080204 | 7/2015 |

* cited by examiner

FIG. 3

$$\begin{bmatrix} R_{in} \\ G_{in} \\ B_{in} \end{bmatrix} \begin{bmatrix} C_{00} & C_{01} & C_{02} \\ C_{10} & C_{11} & C_{12} \\ C_{20} & C_{21} & C_{22} \end{bmatrix} = \begin{bmatrix} R_{out} \\ G_{out} \\ B_{out} \end{bmatrix}$$

300  301  302

DISPLAY OUTPUT IN GRADATION 255

DISPLAY OUTPUT IN GRADATION 1

FIG. 12

$$\begin{bmatrix} C_{00(1)} & C_{01(1)} & C_{02(1)} \\ C_{10(1)} & C_{11(1)} & C_{12(1)} \\ C_{20(1)} & C_{21(1)} & C_{22(1)} \end{bmatrix}$$

$$1300$$
$$\begin{bmatrix} C_{00(2)} & C_{01(2)} & C_{02(2)} \\ C_{10(2)} & C_{11(2)} & C_{12(2)} \\ C_{20(2)} & C_{21(2)} & C_{22(2)} \end{bmatrix}$$

INPUT R GRADATION <= FIRST GRADATION

FIG. 15

FIRST GRADATION < INPUT R GRADATION
<= SECOND GRADATION $C_{00(i)} = d_{(i)} C_{00(1)} + e_{(i)} C_{00(2)}$ $C_{01(i)} = f_{(i)} C_{01(1)} + g_{(i)} C_{01(2)}$ $C_{02(i)} = h_{(i)} C_{02(1)} + i_{(i)} C_{02(2)}$

INPUT R GRADATION > SECOND GRADATION  1600

$$\begin{matrix} 1700 \\ \left[\begin{matrix} R_{in(i)} \\ G_{in(i)} \\ B_{in(i)} \end{matrix}\right] \end{matrix} * \begin{matrix} 1701 \\ \left[\begin{matrix} C_{00(i)} & C_{01(i)} & C_{02(i)} \\ C_{10(i)} & C_{11(i)} & C_{12(i)} \\ C_{20(i)} & C_{21(i)} & C_{22(i)} \end{matrix}\right] \end{matrix} = \begin{matrix} 1702 \\ \left[\begin{matrix} R_{out(i)} \\ G_{out(i)} \\ B_{out(i)} \end{matrix}\right] \end{matrix}$$

DISPLAY DEVICE HAVING AN APPLIED CALIBRATION USING GRADATIONS AND CONTROL METHODS THEREOF

CROSS-REFERENCE TO RELATED APPLICATIONS

This application is a U.S. National Stage Application which claims the benefit under 35 U.S.C. § 371 of International Patent Application No. PCT/KR2016/009072, filed on Aug. 18, 2016, which claims the priority benefit of Korean Patent Application No. 10-2015-0141164, filed on Oct. 7, 2015 in the Korean Patent and Trademark Office, the disclosures of which are hereby incorporated by reference in their entirety.

TECHNICAL FIELD

Apparatuses and methods consistent with exemplary embodiments relate to a display apparatus, which displays an image based on an image signal, and a control method thereof, and more particularly, a display apparatus, which stores a plurality of calibration coefficients to perform uniformity calibrations between pixels in more than at least two gradations for an image signal, and calculates calibration coefficients for the remaining gradations based on the stored calibration coefficients to apply to the image signal, thereby calibrating uniformity for the display, and a control method thereof.

BACKGROUND ART

A display apparatus as a device having a display panel to display images based on various formats of image signals/image data is implemented as a television (TV), a monitor and so on. The display panel is implemented in various configuration types, such as a liquid crystal panel, a plasma panel, etc., according to its properties and is applying to all sorts of display apparatuses.

Due to electrical, physical and optical characteristics, the display apparatus generates changes or modifications in luminance and chromaticity, which are light outputs of pixels, on the reproduced images. Accordingly, when an image signal provided from the same input source is displayed on different display apparatuses, the image signal is reproduced somewhat differently in color. For example, even if the same broadcasting program is provided to the display apparatus via terrestrial or satellite broadcasting, colors shown by the same broadcasting program on the display apparatus are slightly different according to reproducing display apparatuses.

Also, in a high definition display apparatus, if the light outputs of pixels are not uniform, a problem, such as screen blurring or the like, may occur.

To address such a problem, calibration, which makes a light output of the display panel uniform, is used. FIG. 1 illustrates a display apparatus 1 according to a related art and a spectrophotometer 2 for measuring an image outputted from the display apparatus 1 to calibrate a light output of the display apparatus 1. Uniformity calibration between the pixels is performed by measuring and analyzing displayed images using the spectrophotometer to identify calibration coefficients, providing the identified calibration coefficients to the display apparatus 1, and applying the calibration coefficients to the displayed images to make light outputs of the pixels uniform. What the light outputs of the pixels are uniform is means that light outputted from the pixels of the display apparatus 1 based on the received image signals in the same gradation is uniform in luminance and chromaticity.

The Uniformity calibration of the display apparatus 1 according to a related art has been performed by measuring an image in a specific gradation using the spectrophotometer 2 to calculate a calibration coefficient for improving uniformity for the image, and applying the calculated calibration coefficient to all different gradations of the image signal.

DISCLOSURE

Technical Problem

However, since characteristics according to gradations for pixels constituting the display panel of the display apparatus 1 are different, if applying the calibration coefficient calculated based on the image signal of the specific gradation to all other gradations, the uniformity may be broken down again in gradations other than the corrected specific gradation. The breakdown may be reduced in adjacent gradations, but increased in lower gradations. In other words, if to satisfy the uniformity, setting up a calibration coefficient based on an image signal of high gradation, the luminance and the chromaticity between the pixels outputted corresponding to the same image signal will be uniform in the corresponding or adjacent gradations. However, to lower the gradation is, to more deviations between the pixels becomes severe.

Technical Solution

Accordingly, apparatuses and methods consistent with exemplary embodiments provides a display apparatus, which stores calibration coefficients for more than at least two gradations from among a plurality gradations thereby to enhance uniformity in light outputs between a plurality of pixels according to each gradation, and a control methods thereof.

In accordance with an aspect of an exemplary embodiment, there is provided a display apparatus including: a signal receiver configured to receive an image signal having a plurality of gradations; a display configured to display an image based on the received image signal; a storage configured to store a plurality of calibration coefficients corresponding to more than two gradations from among the plurality of gradations to calibrate a uniformity of the image; and a controller configured to control the display to apply to the received image signal a calibration coefficient corresponding to a gradation of the received image signal from among the plurality of gradations to display the image.

The plurality of calibration coefficients may include more than two measurement calibration coefficients, which are generated based on a measurement of the image displayed on the display with respect to more than two preset reference gradations from among the plurality of gradations. Thus, a criteria by which the calibration coefficients are determined is provided.

The plurality of calibration coefficients may include a plurality of calculation calibration coefficients calculated based on the more than two measurement calibration coefficients. Thus, the calibration coefficients are calculated and applied with respect to gradations other than the preset reference gradations.

The more than two preset reference gradations may include a first gradation selected from lower gradations and a second gradation selected from upper gradations from among the plurality of gradations. Thus, the preset reference gradations are provided in the upper gradations and the lower gradations.

At least one of the first gradation or the second gradation may be selected by a user. Thus, the display apparatus provides improved usability.

At least one of the first gradation or the second gradation may be identified depending on characteristics of the image. Thus, the characteristics of the image are considered, thereby enabling the display apparatus to make more accurate uniformity calibration.

The calculation calibration coefficients may include a first calculation calibration coefficient calculated based on a first measurement calibration coefficient with respect to a gradation having a value lower than the first gradation from among the plurality of gradations. Thus, the calibration coefficients according to various gradations are calculated, thereby enabling the display apparatus to make more accurate uniformity calibration.

The calculation calibration coefficients may include a second calculation calibration coefficient calculated based on a first measurement calibration coefficient and a second measurement calibration coefficient with respect to a gradation having a value between the first gradation and the second gradation from among the plurality of gradations. Thus, the calibration coefficients according to various gradations are calculated, thereby enabling the display apparatus to make more accurate uniformity calibration.

The calculation calibration coefficients may include a third calculation calibration coefficient calculated based on a second measurement calibration coefficient with respect to a gradation having a value higher than the second gradation from among the plurality of gradations. Thus, the calibration coefficients according to various gradations are calculated, thereby enabling the display apparatus to make more accurate uniformity calibration.

The plurality of calibration coefficients may include a plurality of lower calibration coefficients stored for each of gradations below a boundary gradation in which the uniformity of the image is less than or equal to a preset threshold value from among the plurality of gradations, and a representative calibration coefficient stored to correspond to a representative gradation, which one of gradations above the boundary gradation. Thus, uniformity in light output in low gradations is more minutely calibrated according to pixel characteristics of the display, thereby enabling the display apparatus to make more accurate uniformity calibration.

At least one of the measurement calibration coefficients or the calculation calibration coefficients may be received from an eternal. Thus, an external apparatus, which identifies and inputs the calibration coefficients, is provided.

In accordance with an aspect of another exemplary embodiment, there is provided a control method of a display apparatus including: receiving an image signal having a plurality of gradations; displaying an image based on the received image signal; storing a plurality of calibration coefficients corresponding to more than two gradations from among the plurality of gradations to calibrate a uniformity of the image; and applying to the received image signal, a calibration coefficient corresponding to a gradation of the received image signal from among the plurality of gradations to display the image.

The storing the plurality of calibration coefficients may include generating more than two measurement calibration coefficients based on a measurement of the displayed image with respect to more than two preset reference gradations from among the plurality of gradations. Thus, a criteria by which the calibration coefficients are determined is provided.

The storing the plurality of calibration coefficients may include calculating a plurality of calculation calibration coefficients based on the more than two measurement calibration coefficients. Thus, the calibration coefficients are calculated and applied with respect to gradations other than the preset reference gradations.

The more than two preset reference gradations may include a first gradation selected from lower gradations and a second gradation selected from upper gradations from among the plurality of gradations. Thus, the preset reference gradations are provided in the upper gradations and the lower gradations.

At least one of the first gradation or the second gradation may be selected by a user. Thus, the gradations to which the calibration coefficients will be measured are selected according to an intention of the user, thereby enabling the display apparatus to provide improved usability.

The storing the plurality of calibration coefficients may include identifying at least one of the first gradation or the second gradation depending on characteristics of the image. Thus, the characteristics of the image are considered, thereby enabling the display apparatus to make more accurate uniformity calibration.

The calculating the plurality of calculation calibration coefficients may include calculating a first calculation calibration coefficient calculated based on a first measurement calibration coefficient with respect to a gradation having a value lower than the first gradation from among the plurality of gradations. Thus, the calibration coefficients according to various gradations are calculated, thereby enabling the display apparatus to make more accurate uniformity calibration.

The calculating the plurality of calculation calibration coefficients may include calculating a second calculation calibration coefficient calculated based on a first measurement calibration coefficient and a second measurement calibration coefficient with respect to a gradation having a value between the first gradation and the second gradation from among the plurality of gradations. Thus, the calibration coefficients according to various gradations are calculated, thereby enabling the display apparatus to make more accurate uniformity calibration.

The calculating the plurality of calculation calibration coefficients may include calculating a third calculation calibration coefficient calculated based on a second measurement calibration coefficient with respect to a gradation having a value higher than the second gradation from among the plurality of gradations. Thus, the calibration coefficients according to various gradations are calculated, thereby enabling the display apparatus to make more accurate uniformity calibration.

The storing the plurality of calibration coefficients may include storing a plurality of lower calibration coefficients stored for each of gradations below a boundary gradation in which the uniformity of the image is less than or equal to a preset threshold value from among the plurality of gradations, and storing a representative calibration coefficient stored to correspond to a representative gradation, which one of gradations above the boundary gradation. Thus, uniformity in light output in low gradations is more minutely calibrated according to pixel characteristics of display, thereby enabling the display apparatus to make more accurate uniformity calibration.

The storing the plurality of calibration coefficients may include receiving at least one of the measurement calibration coefficients or the calculation calibration coefficients from an eternal. Thus, an external apparatus, which identifies and inputs the calibration coefficients, is provided.

Advantages Effects

As described above, according to the exemplary embodiments, the display apparatus may display the image on the display by applying the calibration coefficients stored with respect to more than two gradations from among the plurality of gradations to the received image signal, thereby enabling the display apparatus to accurately calibrate light output thereof.

DESCRIPTION OF DRAWINGS

FIG. 3 illustrates an example of calibrating an input image signal into an output image signal by applying an calibration coefficient to the input image signal according to an exemplary embodiment;

FIG. 12 illustrates a first measurement calibration coefficient;

FIG. 13 illustrates a second measurement calibration coefficient;

FIG. 15 illustrates an example of identifying a calibration coefficient for the R color with respect to gradations above the first gradation and below a second gradation;

FIG. 16 illustrates an example of identifying a calibration coefficient for the R color with respect to gradations above the second gradation;

FIG. 17 illustrates an example of applying calibration coefficients calculated according to gradations for an image signal;

BEST MODE

Figure 1:
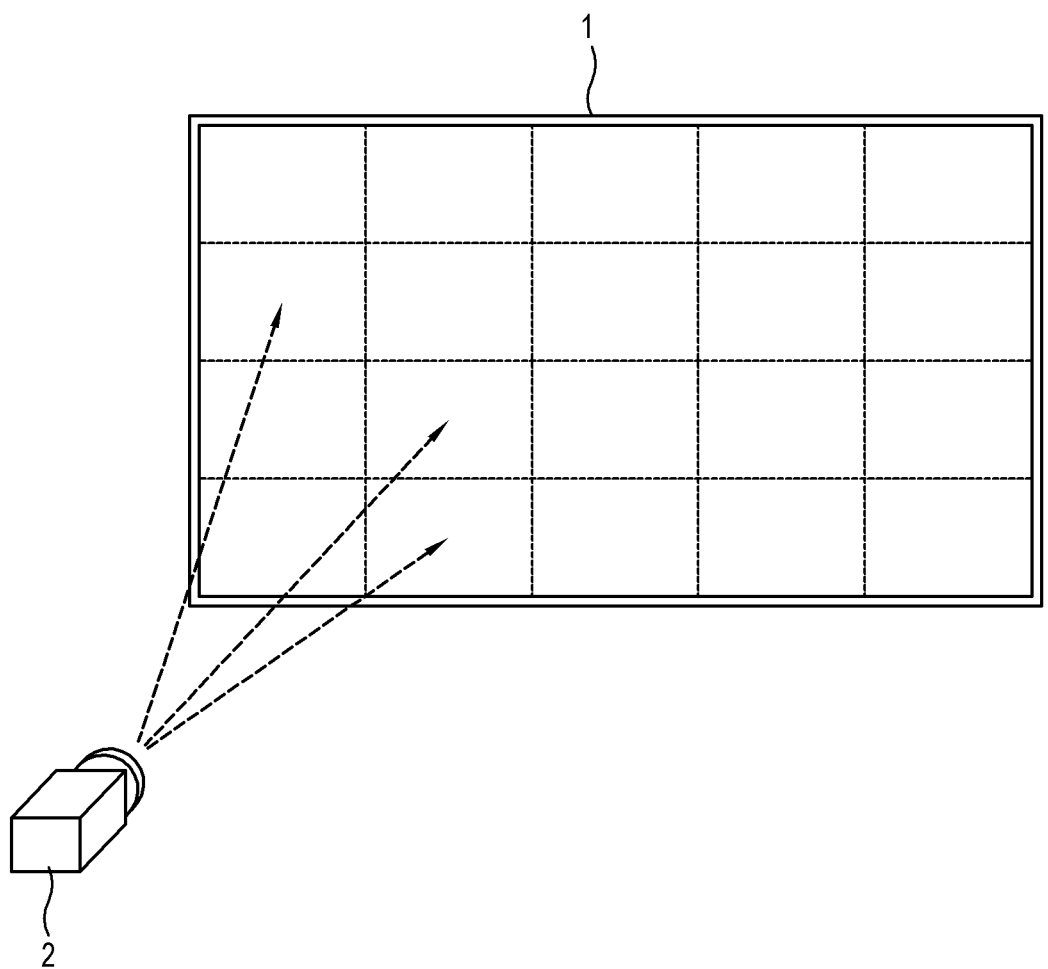
FIG. 1 illustrates a display apparatus and a spectrophotometer for measuring light output of the display apparatus.

Below, exemplary embodiments will be described in detail with reference to accompanying drawings for those skilled in the art to work the present disclosure without difficulty. The exemplary embodiments may be achieved in various forms, and are not limited to the embodiments provided herein. To clearly describe the exemplary embodiments, those unrelated to the description have been omitted, and like reference numerals denote like elements throughout this specification.

Figure 2:
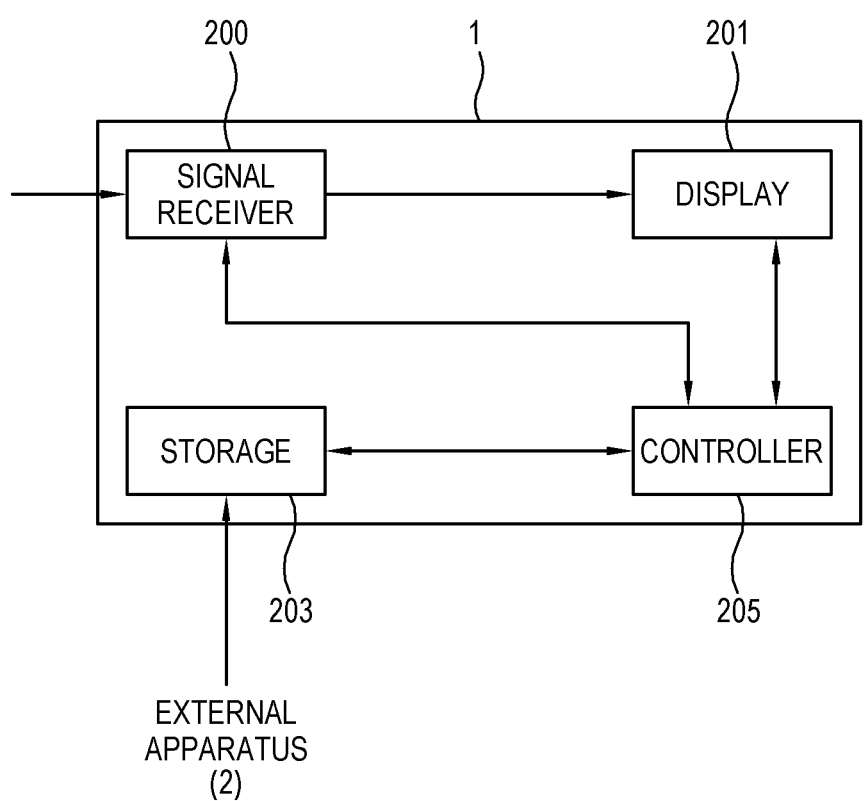
FIG. 2 illustrates a block diagram of a display apparatus according to an exemplary embodiment.

FIG. 2 illustrates a block diagram of a display apparatus according to an exemplary embodiment. The display apparatus 1 displays an image based on a received image signal, but applies stored calibration coefficients to the received image signal to calibrate uniformity for the image. For this, the display apparatus 1 according to an exemplary embodiment may include a signal receiver 200, a display 201, a storage 203 and a controller 205.

The display apparatus 1 may be implemented as a light emitting diode (LED) display apparatus, which outputs pixels for image with a plurality of LEDs, and configured to receive an image signal and to display an image on the display based on the received image signal and stored calibration coefficients. However, the display apparatus 1 is not limited to the LED display apparatus and may be implemented as various types of apparatuses 1, such as, for example, a television (TV), a monitor, a portable media player, a hand phone, a large format display (LFD), etc., which can display images based on image signals/image data received from an external or stored therein.

The signal receiver 200 receives and transmits image signals/image data. The signal receiver 200 may be provided in various forms according to standards of the received image signal and implemented types of the display apparatus 1. For example, the signal receiver 200 may receive a radio frequency (RF) signal transmitted from a broadcasting station by wireless, or an image signal according to standards, such as composite video, component video, super video, SCRAT, high definition multimedia interface (HDMI), display port, unified display interface (UDI) or wireless HD, by wire. If the image signal is a broadcasting signal, the signal receiver 200 may further include a tuner, which tunes the broadcasting signal according to channels, and also receive image data packets from a server via a network.

The display 201 displays the image on the image signal under control of the controller 205. The display 201 may be composed of a display panel with a nonluminous structure and a backlight unit to supply the display panel with light, or a display panel with a self-luminous structure. The display 201 according to an exemplary embodiment may be configured to display the image with a plurality of pixels.

Each pixel is displayed with light, which is outputted according to the image signal from a red LED for displaying a red color, a green LED for displaying a green color and a blue LED for displaying a blue color. However, the pixels may output light in levels different from one another according to individual characteristics of the LEDs, thereby resulting in blurring or haziness on the image, even if image signals of the same gradation are inputted to the pixels, respectively.

To address such a problem, if identifying a calibration coefficient based on a full-white or a specific one gradation and applying the identified coefficient to image signals of different gradation as in the related art, a problem may occur in that since characteristics between gradations of the pixels are not the same, uniformity between pixels, in particular, in lower gradations is in disorder.

To address the problem as described above, the storage 203 according to an exemplary embodiment is configured to store a plurality of calibration coefficients. The plurality of calibration coefficients may be provided to correspond to more than at least two gradations from among a plurality of gradations for the image signal. In other words, an image in a specific gradation on the display 201 may be measured to identify and store a calibration coefficient for calibrating uniformity in light outputs between the pixels, and then, an image in another gradation on the display 201 may be measured to identify and store a calibration coefficient for calibrating uniformity in light outputs between the pixels. The calibration coefficients are provided to correspond to more than at least two gradations from among a plurality of gradations every pixel, and if an image signal is received, a calibration coefficient stored corresponding to a gradation of the received image signal is applied to the received image signal to calibrate uniformity in light outputs between the pixels therefor. Here, the uniformity in light outputs means uniformity in luminance, chromaticity, or both the luminance and the chromaticity, which are outputted from and measured to each pixel, and the uniformity calibration means applying the calibration coefficient corresponding to the gradation of the received image signal to the received image signal, so that each pixel outputs light with luminance, chromaticity, or both the luminance and the chromaticity of the same level based on image signals of the same gradation.

The storage 203 may be provided with a non-volatile memory (writable ROM), which retains data regardless of whether the display apparatus 1 is turned on or off and which is writable to reflect changes. In other words, the storage 203 may be provided with any one of a flash memory, an EPROM or an EEPROM. For the sake of explanation, in the exemplary embodiment, the plurality of calibration coefficients are explained as being stored in a single storage 203, but the present disclosure is not limited thereto. The display apparatus 1 may be provided with a plurality of memories for storing corresponding calibration coefficients every pixel or gradation.

However, since measuring images to identify calibration coefficients for every gradation is time-consuming and expensive, it may be ineffective. Accordingly, according to an exemplary embodiment, calibration coefficients for more than two gradations are first identified by the measurement and then calibration coefficients for remaining gradations are estimated and calculated based on the calibration coefficients identified by the measurement. Below, the calibration coefficients identified by the measurement refers to measurement calibration coefficients and the calibration coefficients calculated based on the relationship between the measurement calibration coefficients refers calculation calibration coefficients.

According to another exemplary embodiment, the display apparatus 1 may receive calibration coefficients via an external apparatus 2 connected thereto, and at least one of measurement calibration coefficients or calculation calibration coefficients may be inputted from an external and stored in the display apparatus.

According to other exemplary embodiment, the calculation calibration coefficients may be not stored in the storage 203, but whenever image signals are received, calculated based on the relationship between measurement calibration coefficients measured based on gradations of the received image signals, and applied to the received image signals.

The controller 205 controls general operation of the display apparatus 1. For example, the controller 205 may apply a calibration coefficient corresponding to a gradation of an image signal to the image signal received via the signal receiver 200 and control to process the image signal to which the calibration coefficient is applied and to display a calibrated image on the display 201.

Also, the controller 205 perform a role, which calculates a calculation calibration coefficient based on a measurement calibration coefficient with respect to each of the plurality of gradation and applies the calculation calibration coefficient corresponding to a gradation of the received image signal to the received image signal.

The calculation calibrations coefficient may be calculated in advance and stored in storage 203 with respect to each gradation, or whenever image signals are received, calculated for each gradation and applied to the received image signals by the controller 205.

FIG. 3 illustrates an example of calibrating an input image signal into an output image signal by applying a calibration coefficient to the input image signal according to an exemplary embodiment.

The input image signal 300 includes a red (R) color, a green (G) color, and a blue (B) color for each pixel and R, G, and B color values are inputted to red, green and blue LEDs, respectively. Outputs of the red, green and blue LEDs are added up based on the respective color values to form one pixel. The input image signal 300 are calibrated into an output image signal 302 by applying a calibration coefficient thereto by the controller 205. The output image signal 302 also includes R, G, B colors for each pixel. The display 201 displays an image based on the output image signal 302 calibrated and processed in the controller 205. Referring to FIG. 3, a calibration coefficient for calibrating the output image signal 300 including three colors is composed of 3*3 matrix.

Hereinafter, each of entries of the calibration coefficient will be described in detail. Entries of the calibration coefficient 301 for calibrating the R color of the pixel are C00, C01, and C02. The entries C00, C01, and C02 are multiplied by an input R color value, an input G color value and an input B color value, respectively, and the sum of them is expressed as an output R color value. Likewise, entries of the calibration coefficient 301 for calibrating the G color of the pixel are C10, C11, and C12. The entries C10, C11, and C12 are multiplied by the input R color value, the input G color value and the input B color value, respectively, and the sum of them is expressed as an output G color value. Likewise, entries of the calibration coefficient 301 for calibrating the B color of the pixel are C20, C21, and C22. The entries C20, C21, and C22 are multiplied by the input R color value, the input G color value and the input B color value, respectively, and the sum of them is expressed as an output B color value.

In the exemplary embodiment, examples of the input image signal 300, the calibration coefficient 301, and the output image signal 302 outputted by applying the calibration coefficient 301 to the input image signal 300 are merely illustrated for the sake of explanation, and the present disclosure is not limited to such a manner in which the input image signal 300, the calibration coefficient 301 and the output image signal 301 are applied, as illustrated above.

Hereinafter, problems of related art will be described in detail with reference to FIGS. 4 to 10.

Figure 4:
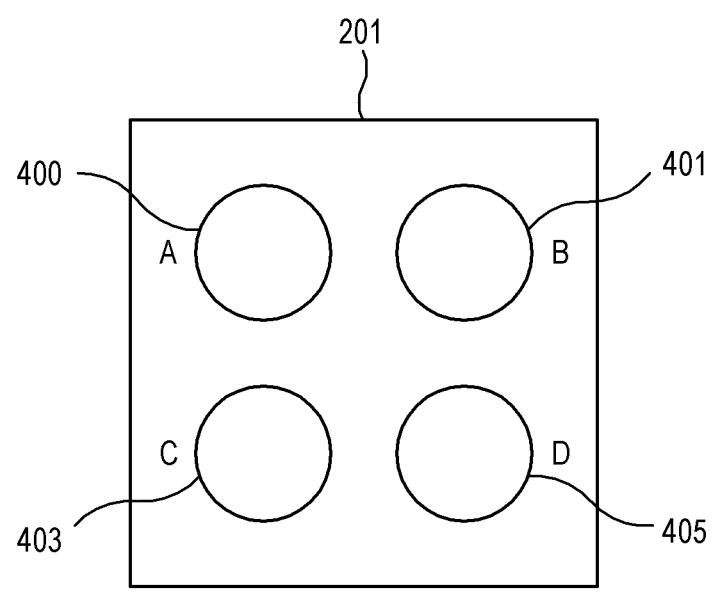
FIG. 4 illustrates a display including a plurality of pixels according to an exemplary embodiment.
Figure 5:
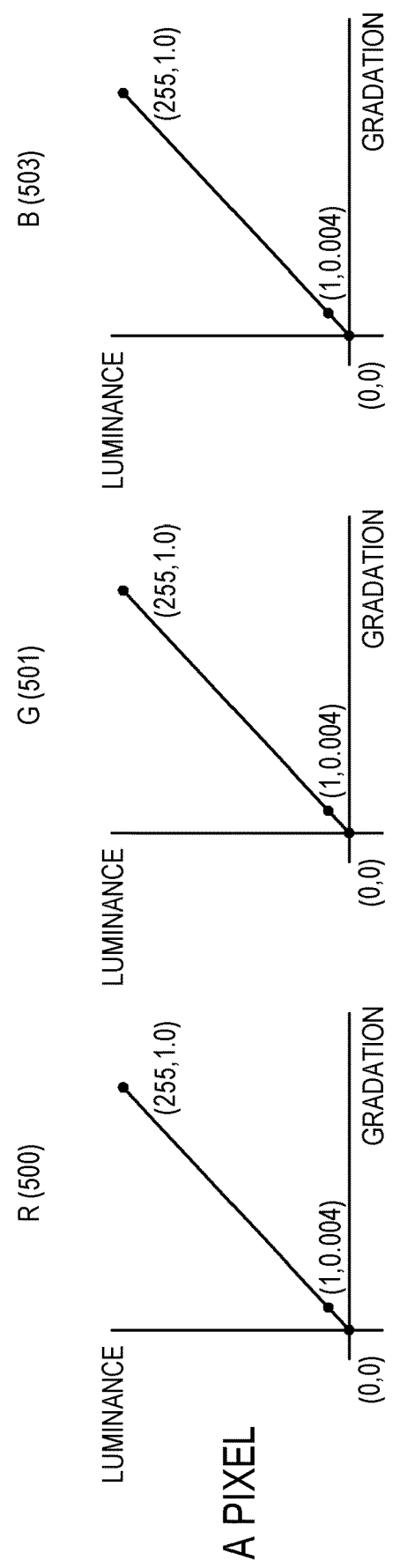
FIG. 5 illustrates luminance characteristics by gradations for a pixel A according to an exemplary embodiment.
Figure 6:
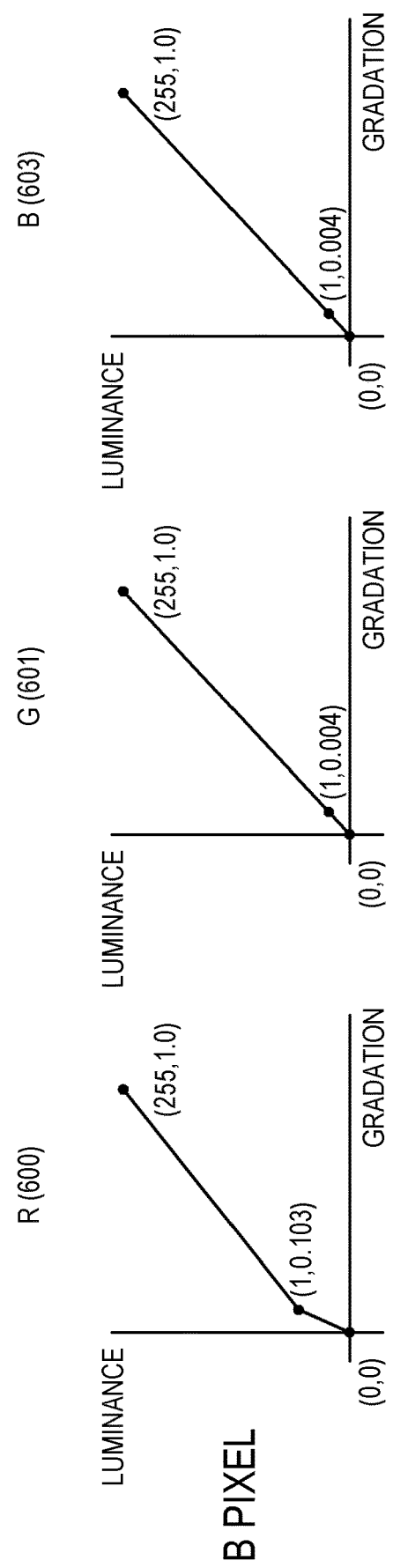
FIG. 6 illustrates luminance characteristics by gradations for a pixel B according to an exemplary embodiment.
Figure 7:
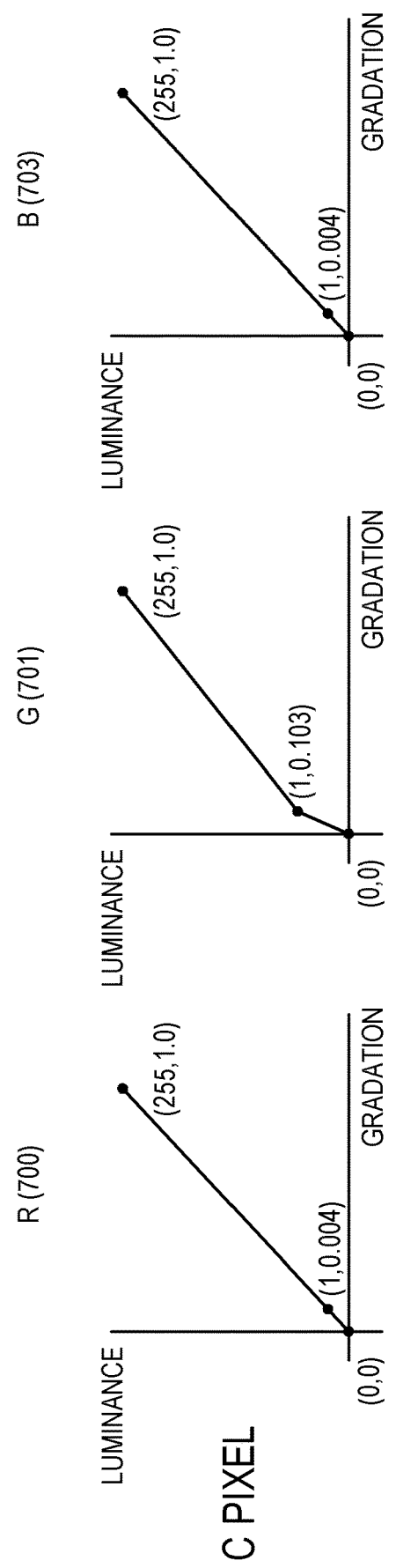
FIG. 7 illustrates luminance characteristics by gradations for a pixel C according to an exemplary embodiment.
Figure 8:
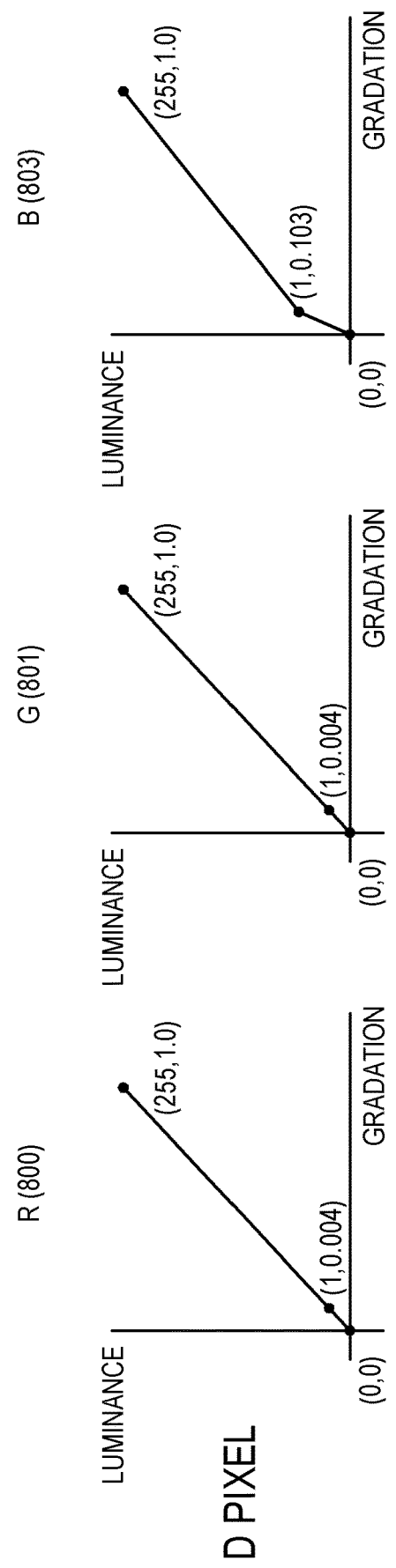
FIG. 8 illustrates luminance characteristics by gradations for a pixel D according to an exemplary embodiment.

FIG. 4 illustrates a display including a plurality of pixels according to an exemplary embodiment. For the sake of explanation, the display 201 according to an exemplary embodiment are illustrated as including four pixels 400, 401, 403 and 405, but the present disclosure is not limited thereto.

FIGS. 5 to 8 illustrate luminance characteristics by gradations according to colors for each of the four pixels 400, 401, 403 and 405 of the display 201, respectively. As described above, each pixel is displayed by adding up light outputs of the red, green and blue LEDs for outputting the R, G, and B color, and due to characteristics in light output of the LEDs, may output different luminance according to colors in the same gradation.

Hereinafter, each pixel includes LEDs according to colors, an R color of each pixel means a red LED, a G color of each pixel means a green LED, and a B color of each pixel means a blue LED. In other words, it should be appreciated that a calibration of R color in a specific pixel is a change of calibration coefficient to be applied to the red LED in the specific pixel.

Characteristics according to R, G, B colors 500, 501 and 503 in a pixel A 400 have luminance of 0.004 in the gradation 1 and 1 in the gradation 255, respectively. Characteristics according to colors in a pixel B 401 have luminance of 0.103 in the gradation 1 and 1 in the gradation 255 with respect to an R color 600, and luminance of 0.004 in the gradation 1 and 1 in the gradation 255 with respect to G and B colors 601 and 603, respectively. Characteristics according to colors in a pixel C 403 have luminance of 0.103 in the gradation 1 and 1 in the gradation 255 with respect to a G color 701, and luminance of 0.004 in the gradations and 1 in the gradation 255 with respect to R and B colors 700 and 703, respectively. Characteristics according to colors in a pixel D 405 have luminance of 0.103 in the gradation 1 and 1 in the gradation 255 with respect to a B color 803, and luminance of 0.004 in the gradation 1 and 1 in the gradation 255 with respect to R and G colors 800 and 801, respectively. The drawings and the explanations as described above are illustrated by way of an example and the luminance characteristics according to gradations of the pixels are not limited thereto.

If to calibrate uniformity between the pixels 400, 401, 403 and 405, measuring the display 201, which outputs an image based on an image signal in the gradation 255, and identifying a calibration coefficient corresponding thereto, all of the R, G, B colors of the respective pixels 400, 401, 403 and 405 is outputted in a luminance of 1 in the gradation 255. Accordingly, C00, C11, and C12 from among the entries of the calibration coefficient come to 1 and remaining coefficients are calculated as 0. If applying the calibration coefficient to the image signal of the gradation 255 according to FIG. 3, Rout, Gout and Bout, which are outputs of LEDs corresponding to respective colors in respective pixels 400, 401, 403 and 405, are outputted to have the gradation 255 as it is and the same luminance, which is 1, so that all of the four pixels 400, 401, 403 and 405 outputs the same full-white of the gradation 255.

Figure 9:
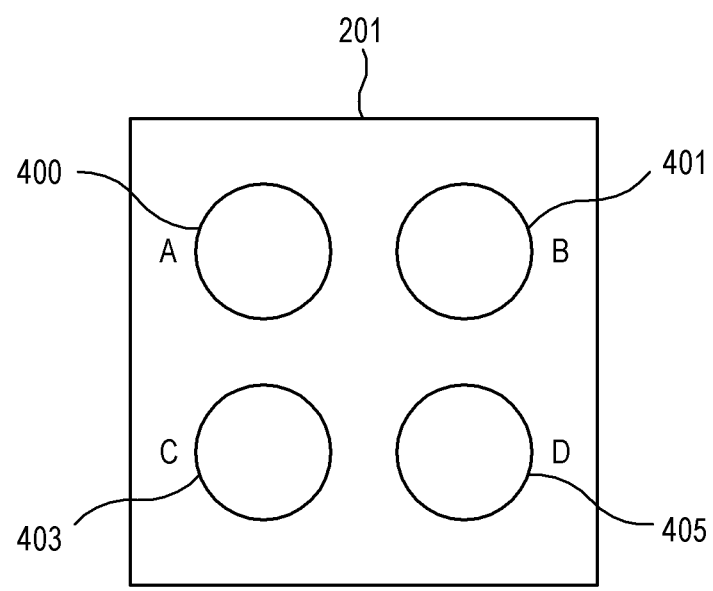
FIG. 9 illustrates light outputs of pixels in a gradation 255 in relation to a calibration coefficient identified in the gradation 255 according to a related art.

FIG. 9 illustrates the display 201 including the four pixels 400, 401, 403 and 405, which output the full-white in the gradation 255, respectively.

If applying the identified calibration coefficient to an image signal of the gradation 1, Rout, Gout and Bout, which are outputs of LEDs corresponding to colors in respective pixels 400, 401, 403 and 405, are outputted to have the gradation 1 as it is. However, since luminance characteristics according to gradations in respective pixels 400, 401, 403 and 405 are different from one another, in particular, respective colors in respective pixels 400, 401, 403 and 405 have luminance different from one another in the gradation 1, light outputs between the pixels 400, 401, 403 and 405 comes to be non-uniform.

Figure 10:
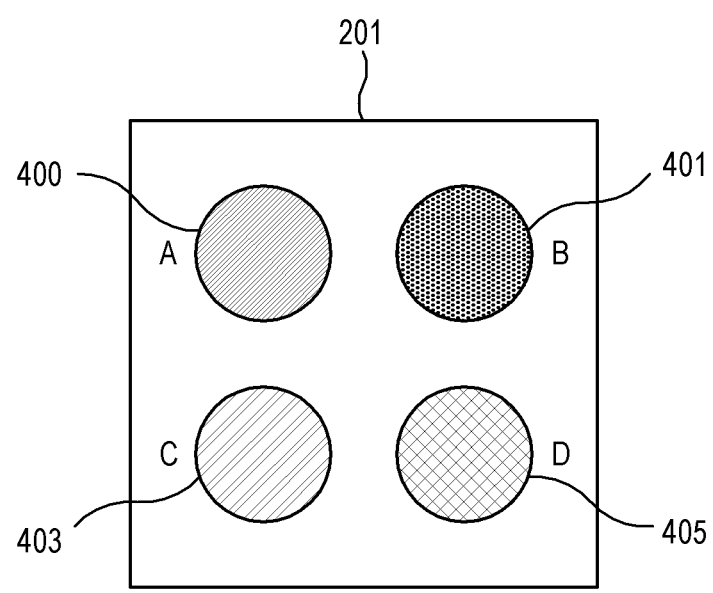
FIG. 10 illustrates light outputs of pixels in a gradation 1 in relation to the calibration coefficient identified in the gradation 255 according to the related art.

In other words, since in the pixel A 400, all of the R, G, B colors 500, 501 and 503 has a luminance of 0.004, the pixel A 400 is displayed as a gray. Since in the pixel B 401, the R color 600 has a luminance of 0.103 and the G and B colors 601 and 603 have a luminance of 0.004, the pixel B 401 is displayed to strongly output the R color 600. Since in the pixel C 403, the G color 701 has a luminance of 0.103 and the R and B colors 700 and 703 have a luminance of 0.004, the pixel C 403 is displayed to strongly output the G color 701. Since in the pixel D 405, the B color 803 has a luminance of 0.103 and the R and G colors 800 and 801 have a luminance of 0.004, the pixel D 405 is displayed to strongly output the B color 803. Outputs of the display 201 in the gradation 1 are illustrated in FIG. 10. Even if light outputs are calibrated to be uniform in the gradation 255, when the image signal of the gradation 1 is received, the pixels A 400, B 401, C 402 and D 405 output light with luminance and chromaticity different from one another, thereby resulting in lack of uniformity in entire light output.

In other words, according to the related art, there is a problem in that a calibration coefficient, which is identified in a specific gradation, can uniformly calibrate outputs between the pixels 400, 401, 402 and 405 in the specific gradation, but if an image signal of gradation different from the specific gradation is received, cannot uniformly calibrate the outputs between the pixels 400, 401, 402 and 405.

Hereinafter, the display apparatus 1, which to address the problem of the related art, selects more than at least two reference gradations from a plurality of gradations and identifies calibration coefficients to the selected reference gradations, will be described.

Figure 11:
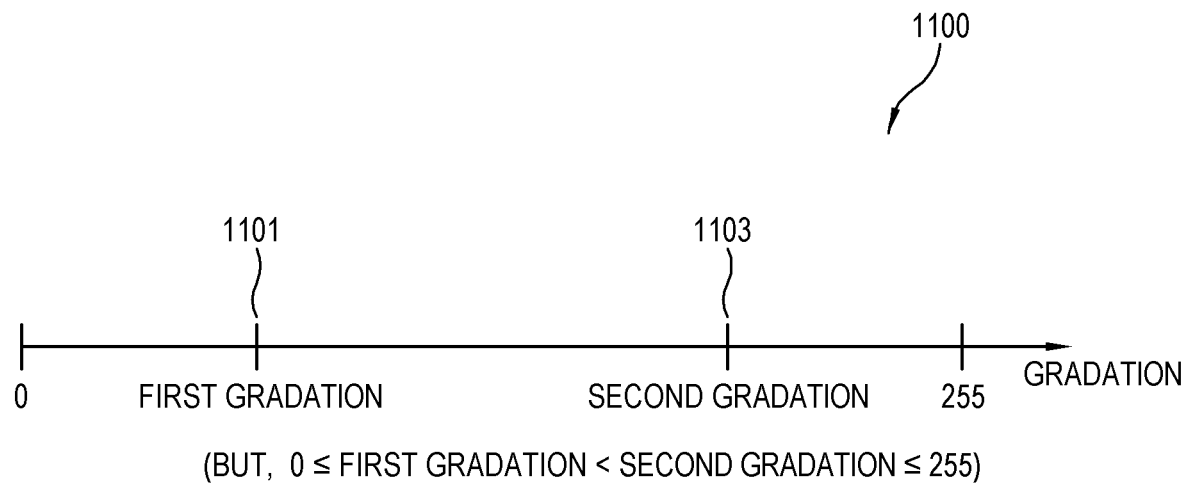
FIG. 11 illustrates an example of identifying reference gradations according to an exemplary embodiment.

FIG. 11 illustrates an example of identifying reference gradations to calibrate uniformity between pixels for gradations according to an exemplary embodiment. The controller 205 may select as reference gradations, a first gradation 1101, which is one of lower gradations from among a plurality of gradations 1100, and a second gradation 1103, which is one of upper gradations from among the plurality of gradations 1100. Also, the reference gradations may be selected by a user, and identified depending on characteristics of an image being outputted. For the sake of explanation, the reference gradations according to an exemplary embodiment are illustrated as two reference gradations, but the present disclosure is not limited to the drawings and explanations.

The display apparatus 1 according to an exemplary embodiment may further include a user input to receive a control command from the user. Also, to calibrate uniformly in light outputs between the pixels 400, 401, 402 and 405 of the display 201 according to gradations, the user may inputs a value of the first gradation 1101 and a value of the second gradation 1103 using a user interface (UI).

According to another exemplary embodiment, the display apparatus 1 may outputs images according to gradations, and then identify a first gradation 1101 from lower gradation from among a plurality of gradations through an external spectrophotometer 1 based on an identification standard, such as identifying whether output deviations between the pixels 400, 401, 403 and 405 are increased from any gradation or the like.

Thereafter, if the spectrophotometer 1 measures light outputs of the display 201 in the identified first and second gradations 1101 and 1103 and inputs the measured values to the controller 205, the controller 205 identifies a first measurement calibration coefficient from the first gradation 1101 and a second measurement calibration coefficient from the second gradation 1103 for calibrating uniformity between the pixels 400, 401, 403 and 405 in respective gradations, and stores the identified first and second measurement calibration coefficients in the storage 203.

In another exemplary embodiment, the light outputs of the display 201 measured by the spectrophotometer 1 may be transmitted to other computing device, and the computing device may be configured to store measurement calibration coefficients and input the measurement calibration coefficients to the storage 203 of the display apparatus 1.

Figure 14:
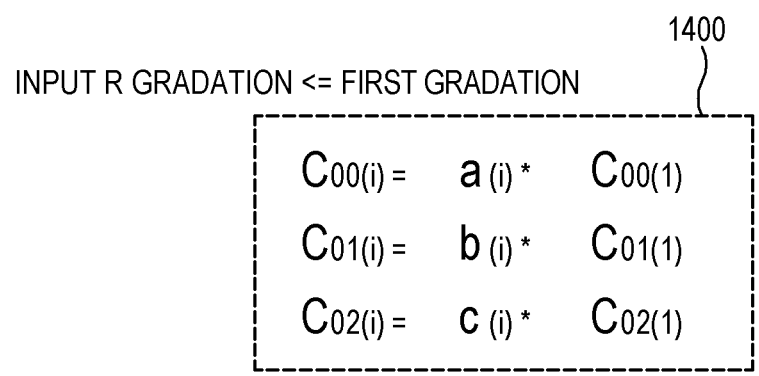
FIG. 14 illustrates an example of identifying a calibration coefficient for an R color with respect to gradations below the first gradation.

FIGS. 12 and 13 illustrate examples of the first and the second measurement calibration coefficients identified with respect to the first and the second gradations, respectively, and FIGS. 14 to 16 illustrate examples of identifying calculation calibration coefficients based on the first and the second measurement calibration coefficients.

FIG. 12 illustrates an example of the first measurement calibration coefficient and FIG. 13 illustrates an example of the second measurement calibration coefficient. As described with reference to FIG. 3, it is assumed that the first measurement calibration coefficient 1200 and the second measurement calibration 1300 are also composed of 3*3 matrix and each entry is also the same as in FIG. 3.

Hereinafter, examples of calculating the calculation calibration coefficients according to gradations will be described with reference to FIGS. 14 to 16.

The measurement calibration coefficients may be identified in multiple coefficients for all of 255 gradations with which the display apparatus 1 can express, but this may be too much time consuming. Accordingly, as described above, the display apparatus 1 according to an exemplary embodiment may be configured to select the first gradation 1101 from the lower gradations from among the plurality of gradations to identify the first measurement calibration coefficient 1200 according to the selected first gradation 1101, and also select the second gradation 1103 from the upper gradations from among the plurality of gradations to identify the second measurement calibration coefficient 1300 according to the selected second gradation 1103.

Also, the display apparatus 1 may calculate calibration coefficients with respect to gradations other than the selected reference gradations to apply to image signals. Hereinafter, the calculated calibration coefficients are referred to calculation calibration coefficients.

FIG. 14 illustrates an example of calculating a calibration coefficient when a gradation of R color in the inputted image signal is lower than or equal to the first gradation 1101.

If the gradation of R color is lower than or equal to the first gradation 1101, a value in which coefficients for calculation a(i), b(i) and c(i) are applied to the entries C00(1), C01(1) and C02(1) of the first measurement calibration coefficient related with the R color may be identified as a first calculation calibration coefficient 1400.

Here, i is an inputted gradation, a(i+1) may have a value different from a(i). To lower the gradation is, to more deviations in light output between the pixels 400, 401, 403 and 405 may be generated. Thus, to more i is close by the first gradation 1101, to more the coefficients for calculation a(i), b(i) and c(i) may be gradually increased. If i is the first gradation 1101, a(i), b(i) and c(i) come to 1 and thus the first measurement calibration coefficient 1200 and the first calculation calibration coefficient 1400 come to have the same value.

In another exemplary embodiment, a(i), b(i) and c(i) may be set up to 1, so that the first measurement calibration coefficient 1200 and the first calculation calibration coefficient 1400 always come to the same value to the extent that the gradation of the image signal is lower than or equal to the first gradation 1101.

FIG. 14 illustrates the calibration coefficient only with respect to the R color, but in the same manner as describe above, calibration coefficients related with the G color and the B color may be also identified.

FIG. 15 illustrates an example of identifying a calibration coefficient when the gradation of R color is higher than the first gradation 1101 and lower than or equal to the second gradation 1103.

If the gradation of R color is higher than the first gradation 1101 and lower than or equal to the second gradation 1103, coefficients for calculation d(i), f(i) and h(i) are applied to the entries C00(1), C01(1) and C02(1) of the first measurement calibration coefficient related with the R color, coefficients for calculation e(i), g(i) and i(i) are applied to the entries C00(2), C01(2) and C02(2) of the second measurement calibration coefficient related with the R color, and the sum of them may be identified as a second calculation calibration coefficient 1500.

Here, to higher the gradation is, to more the coefficients d(i), f(i) and h(i) applied to the first measurement calibration coefficient 1200 is gradually decreased, and to higher the gradation is, to more the coefficients e(i), g(i) and i(i) applied to the second measurement calibration coefficient 1300 is gradually increased. If the gradation of the inputted image signal is equal to the second gradation 1103, d(i), f(i) and h(i) are come to 0 and e(i), g(i) and i(i) come to 1, so that the second measurement calibration coefficient 1300 and the second calculation calibration coefficient 1500 come to have the same value.

FIG. 15 illustrates the calibration coefficient only with respect to the R color, but in the same manner as describe above, calibration coefficients related with the G color and the B color may be also identified.

FIG. 16 illustrates an example of identifying a calibration coefficient when the gradation of R color in the inputted image signal is higher than the second gradation 1103.

If the gradation of R color is higher than the second gradation 1103, a value in which coefficients for calculation j(i), k(i) and l(i) are applied to the entries C00(2), C01(2) and C02(2) of the second measurement calibration coefficient related with the R color may be identified as a third calculation calibration coefficient 1600.

To higher the gradation is, to more the coefficients j(i), k(i) and l(i) applied to the second measurement calibration coefficient 1300 to calculate the third calculation calibration coefficient 1600 may be increased or decreased.

FIG. 16 illustrates the calibration coefficient only with respect to the R color, but in the same manner as describe above, calibration coefficients related with the G color and the B color may be also identified.

In another exemplary embodiment, j(i), k(i) and l(i) may be set up to 1, so that the second measurement calibration coefficient 1300 and the third calculation calibration coefficient 1600 always come to the same value to the extent that the gradation of the image signal is higher than the second gradation 1103.

FIG. 17 illustrates an example of applying the calibration coefficients calculated according to gradations to the image signal.

After, as illustrated in FIGS. 14 to 16, the calculation calibration coefficients are calculated for each gradation according to colors, the controller 205 applies the calculation calibration coefficients to received image signal to uniformly calibrate light outputs of respective pixels 400, 401, 403 and 405 in the display 201.

FIG. 17 illustrates an example of applying a calculated calibration coefficient 1701 to a received image signal 1700 to identify an output image signal 1703 by the controller 205. The calculated calibration coefficient 1701 is calculated by applying the coefficients to at least one of the first measurement calibration coefficient 1200 and the second measurement calibration coefficient 1300 according to the gradations of each of the R, G, and B colors, as described above.

For example, if in the inputted image signal, the gradations of R, G and B colors are 1, 100, and 250, respectively, and the first and the second gradation are 10 and 250, respectively, a coefficient corresponding to the gradation 1 is applied to the first measurement calibration coefficient 1200 to calculate a calibration coefficient of R color, a coefficient corresponding to the gradation 100 is applied to the first measurement calibration coefficient 1200 to calculate a calibration coefficient of G color, the coefficient corresponding to the gradation 100 is applied to the second measurement calibration coefficient 1300, and applied values are summed up. Since the gradation of B color is equal to the second gradation, the second measurement calibration coefficient 1300 comes to a calibration coefficient of B color. Accordingly, the calculated calibration coefficients are as follows:

For the R color, $C00(i=1)=a(i=1)*C00(1);$ $C01(i=1)=b(i=1)*C01(1);$ $C02(i=1)=c(i=1)*C02(1);$ For the G color, $C10(i=100)=d(i=100)*C10(1)+e(i=100)*C10(2)$ $C11(i=100)=f(i=100)*C11(1)+g(i=100)*C11(2)$ $C12(i=100)=h(i=100)*C12(1)+i(i=100)*C12(2)$ For the B color, $C20(i=250)=j(i=250)*C20(2);$ $C21(i=250)=k(i=250)*C21(2);$ $C22(i=250)=l(i=250)*C22(2);$ The controller 205 applies the calibration coefficient 1701 identified for the gradations according to colors to the received input image signal 1700 to transmit the calibrated output image signal 1702 to display 201. The display 201 displays an image in which uniformity is calibrated based the output image signal 1702 under control of the controller 205.

The example of calculating and applying the calibration coefficient 1701 as described above is merely an example, and the present disclosure is not limited to the drawings and explanations.

Figure 18:
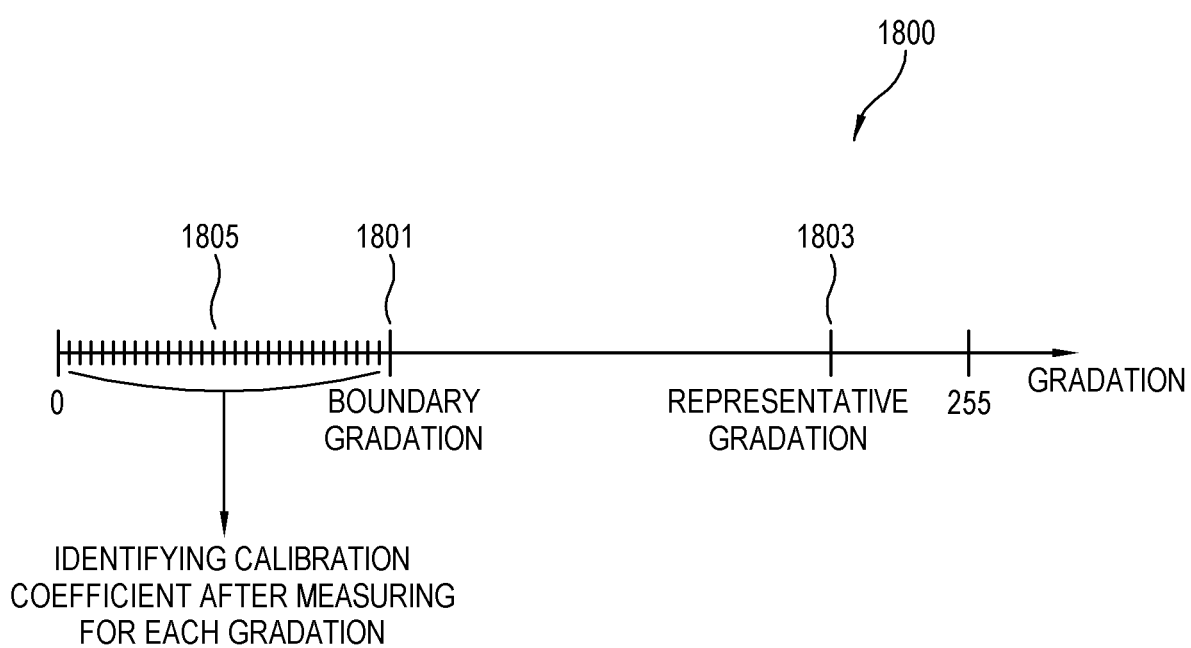
FIG. 18 illustrates an example of a boundary gradation and a representative gradation identified according to an exemplary embodiment.

FIG. 18 illustrates an example of identifying a boundary gradation and a representative gradation, identifying a plurality of sub-calibration coefficients with respect to each of gradations below the boundary gradation, and identifying a representative calibration coefficient with respect to the representative gradation according to an exemplary embodiment.

The controller 205 may identify a boundary gradation 1801 and a representative gradation 1803 from among a plurality of gradations 1800 by a selection of the user or based on deviations in light output between the pixels 400, 401, 403, and 405 measured by the spectrophotometer 2.

The controller 205 identifies a plurality of sub-calibration coefficients based on results measured by the spectrophotometer 2 with respect to a plurality of sub-gradations 1805 below the identified boundary gradation 1801. If a gradation of the input image signal 1700 is lower than the boundary gradation 1801, the controller 205 applies a measurement calibration coefficient identified to correspond to the gradation of the input image signal 1700.

Also, the controller 205 identifies a representative gradation 1803, which is a gradation higher than the boundary gradation 1801, from among the plurality of gradations 1800, and identifies a representative calibration coefficient based on the results measured by the spectrophotometer 2 with respect to the representative gradation 1803. If the gradation of the input image signal 1700 is higher than the boundary gradation 1801, the controller 205 applies the representative calibration identified with respect to the representative gradation 1803 to the input image signal 1700, regardless of the gradation of the input image signal 1700.

Figure 19:
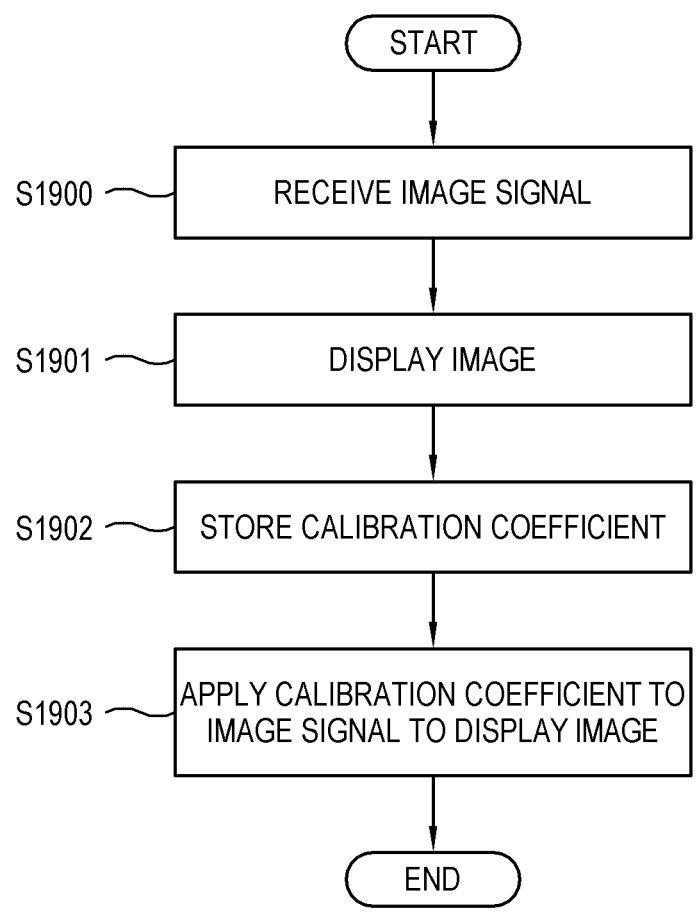
FIG. 19 illustrates a flowchart for a method where a display apparatus is controlled according to an exemplary embodiment.

FIG. 19 illustrates a flowchart for a method where the display apparatus is controlled according to an exemplary embodiment.

First, at an operation S1900, the signal receiver 200 receives an image signal 300 from an external. At an operation S1901, the display 201 displays an image based on the received image signal 300. At an operation S1902, the storage 203 stores calibration coefficients 301. Lastly, at an operation S1903, the controller 205 controls the display 201 to display an image signal 303 to which the stored calibration coefficients 301 are applied.

While receiving the image signal from a broadcasting station or the external (S1900) and displaying the image (S1901), the display apparatus 1 measures the displayed image using the spectrophotometer 2 in order to calibrate uniformity between pixels 400, 401, 403 and 405 in the display 201. The controller 205 may identify calibration coefficients 301 for more than at least two from among a plurality of gradations based on measured values transmitted from the spectrophotometer 2 to store in the storage (S1902), or receive identified calibration coefficients 301 from the spectrophotometer 2. The controller 205 applies to the input image signal 300, the calibration coefficients 301 identified to correspond to the gradation of the input image signal 300, thereby uniformly calibrating light outputs between the plurality of pixels 400, 401, 403 and 405.

Figure 20:
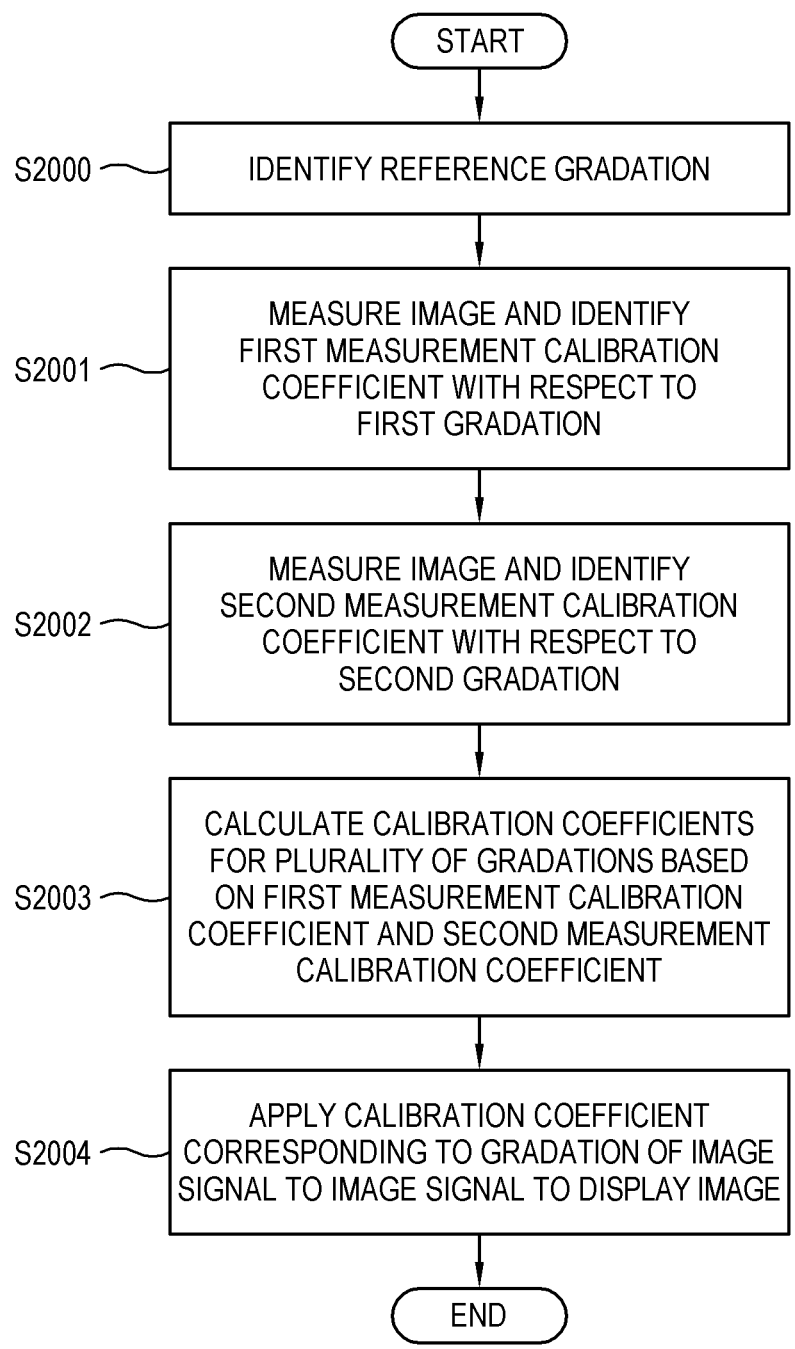
FIG. 20 illustrates a flowchart of where measurement calibration coefficients and calculation calibration coefficients are identified according to an exemplary embodiment.

FIG. 20 illustrates a flowchart of where the measurement calibration coefficients and the calculation calibration coefficients are identified according to an exemplary embodiment.

First, at an operation S2000, the controller 205 identifies reference gradations. At an operation S2001, the spectrophotometer 2 measures light outputs of the pixels 400, 401, 403 and 405 outputted according to a first gradation among the reference gradations and transmits the measured values to the controller 205, and the controller 205 identifies a first measurement calibration coefficient 1200 based on the measured values. At an operation S2002, the spectrophotometer 2 measures light outputs of the pixels 400, 401, 403 and 405 outputted according to a second gradation among the reference gradations and transmits the measured values to the controller 205, and the controller 205 identifies a second measurement calibration coefficient 1300 based on the measured values. At an operation S2003, the controller 205 calculates calibration coefficients for gradations other than the reference gradations based on the first measurement calibration coefficient 1200 and the second measurement calibration coefficient 1300. Lastly, at an operation 2004, the controller 205 controls the display 201 to display an image signal to which the calibration coefficients 1701 are applied.

The reference gradations may be identified by an input of the user or according to deviations in light output between the pixels 400, 401, 403, and 405 for each gradation, as described above (S2000). The reference gradations may be identified as multiple gradations. In the exemplary embodiment, the reference gradations may be identified as a first gradation and a second gradation, but the present disclosure is not limited to thereto.

The controller 205 identifies the first measurement calibration coefficient 1200 and the second measurement calibration coefficient 1300 based on values measured by the spectrophotometer 2 to images with respect to the first gradation and the second gradation from among the reference gradations (S2001, S2002), and stores the first measurement calibration coefficient 1200 and the second measurement calibration coefficient 1300 in the storage 203. The measurement and identification of the calibration coefficients were described above.

The controller 205 identifies calculation calibration coefficients 1701 based on the first measurement calibration coefficient 1200 and the second measurement calibration coefficient 1300 with respect to each of the plurality of gradations (S2003). It was described above that the calculation calibration coefficients 1701 may be identified based on the relationship between the coefficients for calculation and at least one of the first measurement calibration coefficient 1200 and the second measurement calibration coefficient 1300.

The controller 205 may be configured to calculate the calculation calibration coefficients 1701 in advance with respect to each of the plurality of gradations and store the calculation calibration coefficients 1701 in the storage 203, and to display, if the input image signal 1700 is received, an image to which a calculation calibration coefficients 1701 corresponding to a gradation of the input image signal 1700 is applied.

According to another exemplary embodiment, the controller 205 may be configured to calculate, if an input image signal 1700 is received, calculation calibration coefficients 1701 based on the first measurement calibration coefficient 1200 and the second measurement calibration coefficient 1300 according to a gradation of the input image signal 1700 and to display on the display 201, an image to which an output image signal 1703 calibrated based on the calculation calibration coefficients 1701 is applied.

Figure 21:
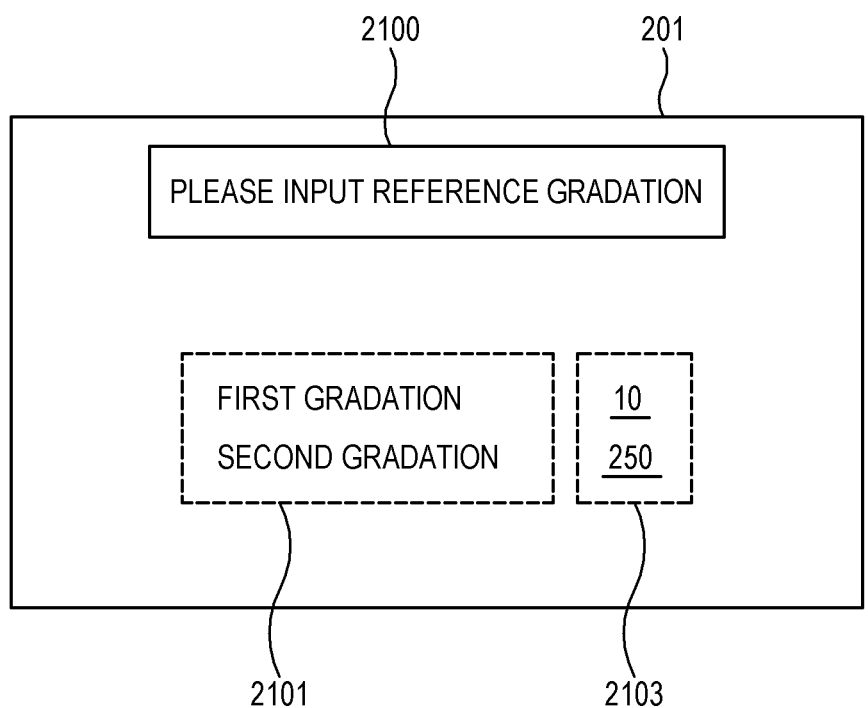
FIG. 21 illustrates a user interface (UI) provided to receive reference gradations from a user according to an exemplary embodiment.

FIG. 21 illustrates a user interface (UI) provided to receive the reference gradations from the user according to an exemplary embodiment.

As described above, the controller 205 identifies the reference gradations, and identifies the measurement calibration coefficients 1200 and 1300 based on light output values of the pixels 400, 401, 403 and 405 according to the identified reference gradations measured by the spectrophotometer 2.

The reference gradations may be identified by an input of the user, and the display apparatus 1 according to an exemplary embodiment provides a UI through the display 201 to allow the user to input the reference gradations. The UI includes a guide 2100 to solicit for the input of the reference gradations, reference gradation names 2101 and gradation input items 2103.

The user may input gradations she or he want to identify as reference gradation names 2101, into gradation input items 2103 via the UI.

In the exemplary embodiment, the reference gradation names 2101 are illustrated as two gradations, i.e., a first gradation and a second gradation, but this is merely an example and the present disclosure is not limited thereto.

Figure 22:
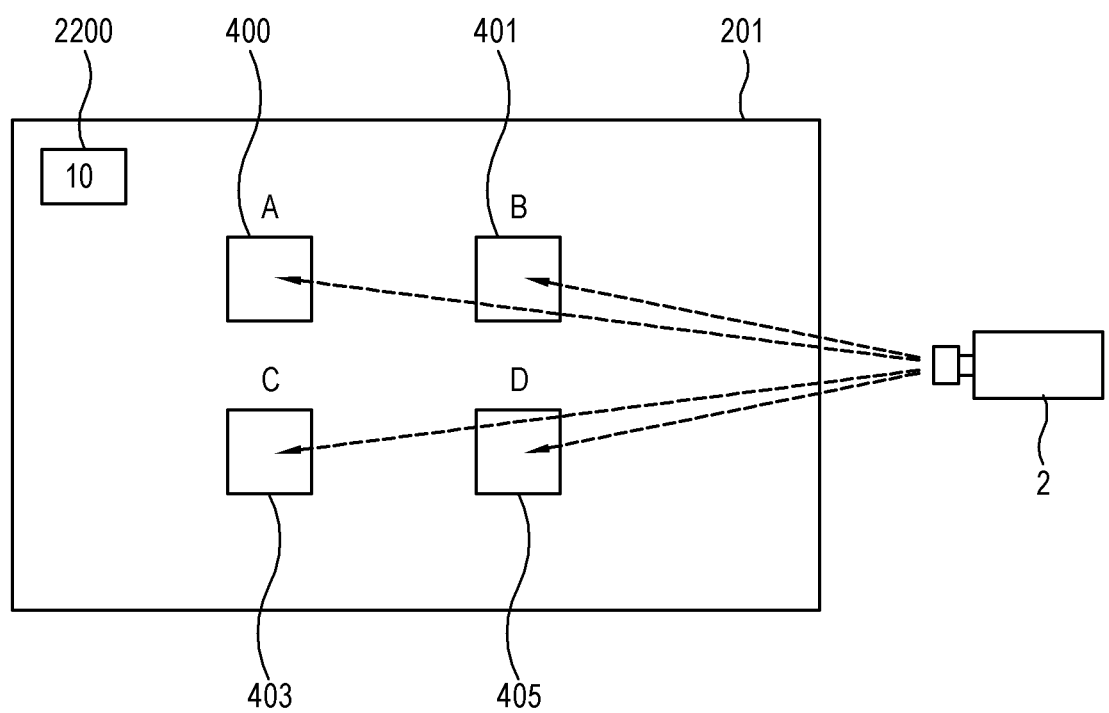
FIG. 22 illustrates an example of measuring deviations in light output between pixels for each gradation to identify a boundary gradation according to an exemplary embodiment.
Figure 23:
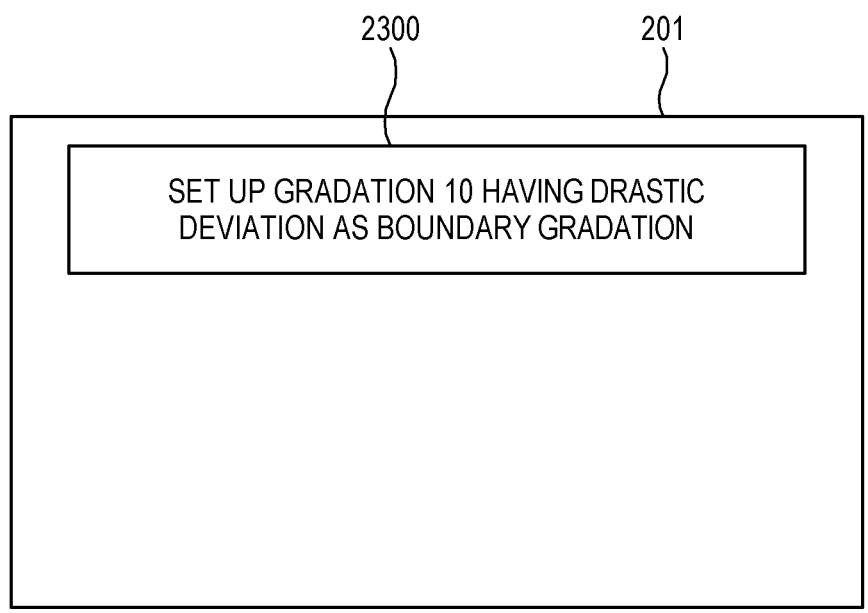
FIG. 23 illustrates an example of selecting a boundary gradation to guide the user, based on the deviations in light output between the measured pixels according to an exemplary embodiment.

FIGS. 22 and 23 illustrate examples of measuring deviations in light output between the pixels according to gradations through color measurement and selecting a boundary gradation based on the measured deviations.

The controller 205 may receive the boundary gradation through an input from the user, but may also be configured to select as the boundary gradation, a gradation 2200 in which the deviations in light output between the pixels 400, 401, 403 and 405 become severe, based on the deviations in light output between the pixels 400, 401, 403 and 405 measured according to gradations by the spectrophotometer 2.

FIG. 22 illustrates an examples of measuring light outputs of the pixels 400, 401, 403 and 405 of the display 201 according to gradations 2200 by the spectrophotometer 2. If the display apparatus 1 displays images while changing gradations 2200, the spectrophotometer 2 measures light outputs between the pixels 400, 401, 403 and 405 to provide measured values and the controller 205 may select a gradation 2200 in which the deviations in light output between the pixels 400, 401, 403 and 405 become severe based on the measured values.

FIG. 23 illustrates the display 201, which a UI including a guide 2300 to inform the user that a gradation in which the deviations in light output between the pixels become severe from among a plurality of gradations 1800 was selected as a boundary gradation 1801. After the boundary gradation 1801 is selected, the controller 205 identifies a plurality of sub-calibration coefficients based on light output values between the pixels 400, 401, 403 and 405 measured for each of the plurality of gradations 1800 below the boundary gradation 1801.

The invention claimed is:

1. A display apparatus comprising:
a signal receiver configured to receive an image signal;
a display configured to display an image based on the received image signal; and
a controller configured to:
identify a first calibration coefficient corresponding to a first gradation and a second calibration coefficient corresponding to a second gradation among a plurality of gradations, the second gradation being higher than the first gradation, identify a third calibration coefficient for calibrating a uniformity of the image based on at least one of the identified first calibration coefficient or the identified second calibration coefficient, the third calibration coefficient corresponding to a gradation of the received image signal, and control the display to apply, to the received image signal, the identified third calibration coefficient, wherein the applied third calibration coefficient comprises the first calibration coefficient identified based on the gradation of the received image signal being lower than the first gradation, and wherein the applied third calibration coefficient comprises the second calibration coefficient identified based on the gradation of the received image signal being higher than the second gradation.

2. The apparatus according to claim 1, wherein the first calibration coefficient, the second calibration coefficient, and the third calibration coefficient include measurement calibration coefficients, which are generated based on a measurement of the displayed image.

3. The apparatus according to claim 2, wherein the first calibration coefficient, the second calibration coefficient, and the third calibration coefficient include calculation calibration coefficients calculated based on the measurement calibration coefficients.

4. The apparatus according to claim 3, wherein the first gradation is selected from lower gradations and the second gradation is selected from upper gradations from among the plurality of gradations.

5. The apparatus according to claim 4, wherein at least one of the first gradation or the second gradation is selected by a user.

6. The apparatus according to claim 4, wherein at least one of the first gradation or the second gradation is identified depending on characteristics of the image.

7. The apparatus according to claim 4, wherein the calculation calibration coefficients comprises a first calculation calibration coefficient calculated based on a first measurement calibration coefficient with respect to a gradation having a value lower than the first gradation from among the plurality of gradations.

8. The apparatus according to claim 4, wherein the calculation calibration coefficients comprises a second calculation calibration coefficient calculated based on a first measurement calibration coefficient and a second measurement calibration coefficient with respect to a gradation having a value between the first gradation and the second gradation from among the plurality of gradations.

9. The apparatus according to claim 4, wherein the calculation calibration coefficients comprises a third calculation calibration coefficient calculated based on a second measurement calibration coefficient with respect to a gradation having a value higher than the second gradation from among the plurality of gradations.

10. The apparatus according to claim 3, wherein at least one of the measurement calibration coefficients or the calculation calibration coefficients is received from an external apparatus.

11. The apparatus according to claim 1, wherein the first calibration coefficient, the second calibration coefficient, and the third calibration coefficient include:

a plurality of lower calibration coefficients stored for each of gradations below a boundary gradation in which the uniformity of the image is less than or equal to a preset threshold value from among the plurality of gradations; and a representative calibration coefficient stored to correspond to a representative gradation, which is one of gradations above the boundary gradation from among the plurality of gradations.

12. A control method of a display apparatus comprising:

receiving an image signal;

displaying an image based on the received image signal;

identifying a first calibration coefficient corresponding to a first gradation and a second calibration coefficient corresponding to a second gradation among a plurality of gradations, the second gradation being higher than the first gradation, identifying a third calibration coefficient for calibrating a uniformity of the image based on at least one of the identified first calibration coefficient or the identified second calibration coefficient, the third calibration coefficient corresponding to a gradation of the received image signal, and applying, to the received image signal, the identified third calibration coefficient, wherein the applied third calibration coefficient comprises the first calibration coefficient identified based on the gradation of the received image signal being lower than the first gradation, and wherein the applied third calibration coefficient comprises the second calibration coefficient identified based on the gradation of the received image signal being higher than the second gradation.

13. The method according to claim 12, wherein the first calibration coefficient, the second calibration coefficient, and the third calibration coefficient include measurement calibration coefficients, which are generated based on a measurement of the displayed image.

14. The method according to claim 13, wherein the first calibration coefficient, the second calibration coefficient, and the third calibration coefficient include calculation calibration coefficients calculated based on the measurement calibration coefficients.

15. The method according to claim 14, wherein the first gradation is selected from lower gradations and the second gradation is selected from upper gradations from among the plurality of gradations.

* * * * *